United States Patent [19]

Adachi

[11] Patent Number: 4,608,607
[45] Date of Patent: Aug. 26, 1986

[54] DATA COMPRESSION DEVICE FOR PICTURE PROCESSING APPARATUS

[75] Inventor: Eiichi Adachi, Atsugi, Japan

[73] Assignee: Ricoh Company, Ltd., Tokyo, Japan

[21] Appl. No.: 617,207

[22] Filed: Jun. 4, 1984

[30] Foreign Application Priority Data

Jun. 15, 1983 [JP] Japan .................................. 58-105772

[51] Int. Cl.⁴ .............................................. H04N 1/44
[52] U.S. Cl. ..................................... 358/260; 358/261
[58] Field of Search .................................. 358/260, 261

[56] References Cited

U.S. PATENT DOCUMENTS

| | | | |
|---|---|---|---|
| 3,830,964 | 8/1974 | Spencer ............................. | 358/260 |
| 4,090,222 | 5/1978 | Nakagome et al. ................. | 358/261 |
| 4,245,257 | 1/1981 | Yamazaki et al. ................. | 358/261 |
| 4,257,069 | 3/1981 | Murayama et al. ................ | 358/261 |
| 4,258,392 | 3/1981 | Yamazaki et al. .................. | 358/261 |

Primary Examiner—James J. Groody
Assistant Examiner—John K. Peng
Attorney, Agent, or Firm—David G. Alexander

[57] ABSTRACT

A data compression device for a facsimile apparatus or like picture processing apparatus is operable with a desirable coding efficiency to remarkably reduce the transmission time. When the absolute value of a difference between the numbers of transition points of picture signals associated with two adjacent scanning lines is larger than a predetermined run difference coefficient, the device codes the picture signals by a one-dimensional mode coding operation which occurs with respect to the main scan direction only. When the former is equal to or smaller than the latter, the device codes the picture signals in a two-dimensional mode coding operation which occurs with respect to both the main scan direction and the subscan direction.

9 Claims, 2 Drawing Figures

DATA COMPRESSION DEVICE FOR PICTURE PROCESSING APPARATUS

BACKGROUND OF THE INVENTION

The present invention relates to an improvement in a data compression device for a facsimile apparatus or like picture processing apparatus.

In facsimile communications, for example, so-called redundancy reduction coding is performed on picture signals with a view to shortening the transmission time. Generally, two different modes are available for redundancy reduction coding, i.e., one-dimensional mode wherein picture signals are coded by a processing which occurs with respect to the main scanning line direction only, and two-dimensional mode wherein signals are processed taking into account the direction of subscanning lines as well (inclusive of two-dimensional batch coding and two-dimensional sequential coding). It is generally accepted that the two-dimensional coding mode offers a greater compression effect than the one-dimensional coding mode.

Nevertheless, the compression efficiency attainable with one-dimensional coding is sometimes greater than that attainable with two-dimensional coding such as at the border between a character line and an interlinear space in an ordinary document. In light of this, there has been proposed a coding system which determines a correlationship between adjacent scanning lines and selectively combines the one-dimensional and two-dimensional coding modes based on the determined correlationship, as disclosed in Japanese Patent Laid-Open Publication No. 54-12515.

The above-described coding system offers a significant improvement in compression efficiency over the simple two-dimensional coding system. However, since the selective adoption of the two different coding modes requires division, the operation is intricate and consumes a disproportionate period of time.

SUMMARY OF THE INVENTION

It is therefore an object of the present invention to provide an efficient data compression device for a picture processing apparatus which selectively adopts the two coding modes with desirable efficiency without resorting to division, thereby reducing the transmission time.

It is another object of the present invention to provide a generally improved data compression device for a picture processing apparatus.

A data compression device for redundancy reduction coding picture signals of the present invention comprises a transition point detector for detecting transition points of picture signals associated with two adjacent scanning lines, a transition point counter for counting the detected transition points of the picture signals, a calculator for producing an absolute value of a difference between the counted numbers of the transition points of the respective picture signals, a decision circuit for comparing the calculated absolute value with a predetermined value to select an adequate coding mode, and an encoder for selectively performing a one-dimensional mode coding operation and a two-dimensional mode coding operation in response to a result of the selection by the decision circuit.

In accordance with the present invention, a data compression device for a facsimile apparatus or like picture processing apparatus is operable with a desirable coding efficiency to remarkably reduce the transmission time. When the absolute value of a difference between the numbers of transition points of picture signals associated with two adjacent scanning lines is larger than a predetermined run difference coefficient, the device codes the picture signals by a one-dimensional mode coding operation which occurs with respect to the main scan direction only. When the former is equal to or smaller than the latter, the device codes the picture signals in a two dimensional mode coding operation which occurs with respect to both the main scan direction and the subscan direction.

The above and other objects, features and advantages of the present invention will become apparent from the following detailed description taken with the accompanying drawings.

DESCRIPTION OF THE PREFERRED EMBODIMENT

While the data compression device for a picture processing apparatus of the present invention is susceptible of numerous physical embodiments, depending upon the environment and requirements of use, a substantial number of the herein shown and described embodiment have been made, tested and used, and all have performed in an eminently satisfactory manner.

First, the principle concept of the present invention will be described. Namely, assuming that the numbers of points where picture signals associated with two adjacent scanning lines individually change fron white to black or from black to white (referred to as "transition points" hereinafter) are respectively $N_1$ and $N_2$, an absolute value r of their difference is calculated:

$$r = |N_1 - N_2| \quad (1)$$

The absolute value r is compared with a reference value R (referred to as "run difference coefficient" hereinafter) which is determined in advance by an experiment or the like and is a positive integer inclusive of zero. If $$r > R \quad (2)$$

the one-dimensional coding mode is selected, while if $$r \leq R \quad (3)$$

the two-dimensional coding mode is selected.

Figure 1:
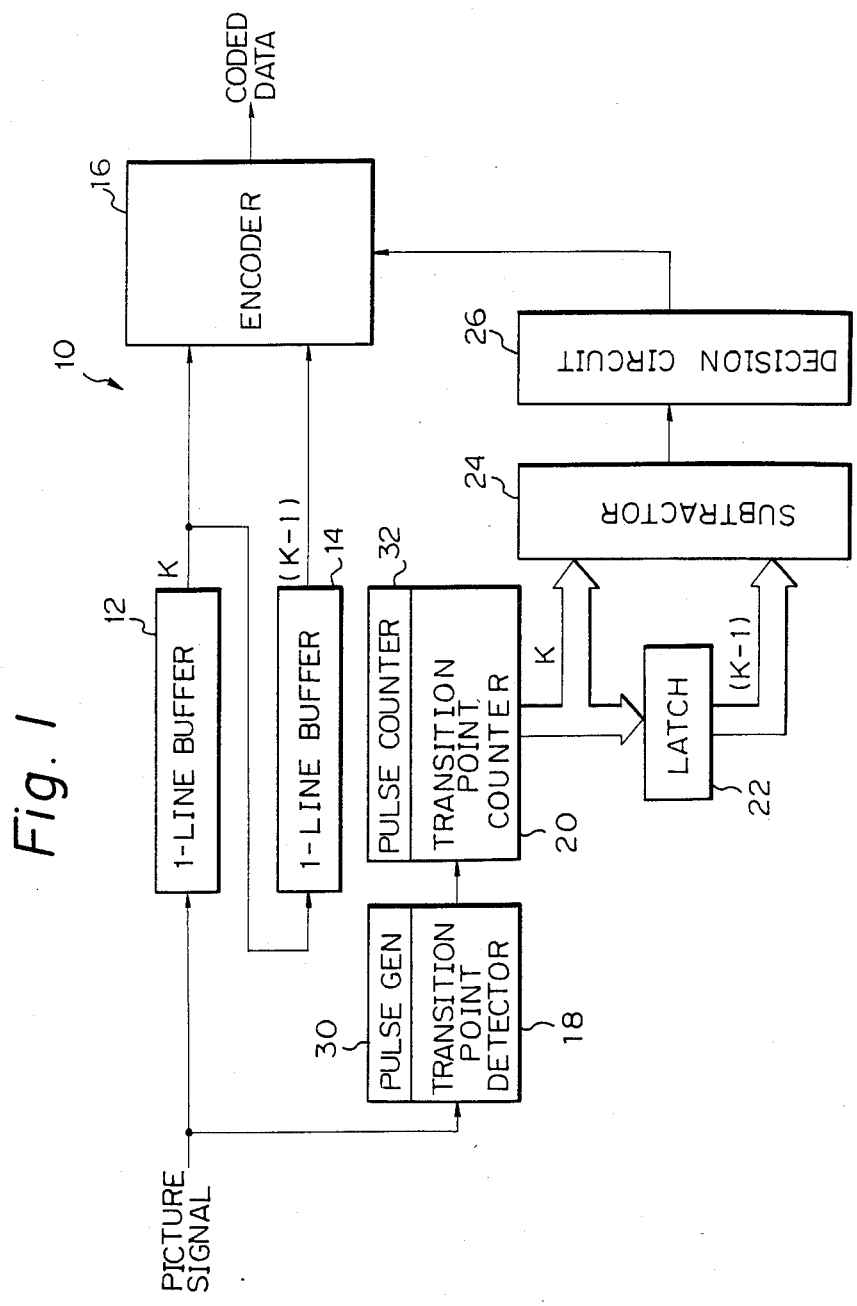
FIG. 1 is a block diagram of a data compression device embodying the present invention.

Referring now to FIG. 1 of the drawings, a data compression device in accordance with the present invention is shown and generally designated by the reference numeral 10. The device 10 includes a 1-line buffer 12 for storing one line of incoming picture signal. The 1-line buffer 12 is connected to another 1-line buffer 14 adapted for the same function as the buffer 12, and to an encoder 16 selectively operable either in the one-dimensional and two-dimensional modes. The input picture signal is also applied to a transition point detector 18 adapted to detect transition points of the picture signal. The transition point detector 18 is connected to a transition point counter 20 which counts up the detected transition points. The counter 20 is connected to a latch 22 for latching an output of the counter 20, and to a subtractor 24 which constitutes a calculator mean for for producing a difference between an output of the counter 20 and that of the latch 22. The subtractor 24 is connected to a decision circuit 26 which compares the difference with the run difference coefficient R and applies the result to the encoder 16.

In operation, picture signals output from a reader or like picture signal generating device (not shown) are sequentially applied to the 1-line buffer 12 and transition point detector 18 one line at a time. Assuming that a picture signal arrived at the 1-line buffer 12 is associated with the K-th line, the 1-line buffer 12 has stored a picture signal associated with the (K−1)-th line by the last processing; upon the arrival of the K-th line picture signal, the (K−1)-th line picture signal is transferred from the buffer 12 to the buffer 14.

Meanwhile, the transition point detector 18 comprises a pulse generator 30 which applies a pulse to a pulse counter 32 of its associated counter 20 every time it detects a transition point of the picture signal on the K-th line. The counter 20, before starting counting the transition points on the K-th line in terms of the number of input pulses, supplies the latch 22 with a count of transition points on the (K−1)-th line which it has stored.

At the time when the entry of the K-th line picture signal completes, therefore, the 1-line buffer 12 has stored the K-th line picture signal and the other 1-line buffer 14, the (K−1)-th line picture signal. At the same time, the counter 20 has stored the number of transition points on the K-th line and the latch 22, that on the (K−1)-th line. Such a momentary situation is shown in FIG. 1. Those stored values are immediately applied to the subtractor 24 under the control of a system controller (not shown). Using such numerical values, the subtractor 24 performs the previously mentioned operation (1) and supplies the result r to the decision circuit 26. The decision circuit 26 compares the value r with the run difference coefficient R and, if the relation (2) holds, sends a one-dimensional mode operation command to the encoder 16 and, if the relation (3) holds, a two-dimensional mode operation command. The pulse generator 30 generates a pulse every time the transition point detector means 18 detects a transition point. The pulse counter 32 counts the pulses generated by the pulse generator 30.

The system controller, monitorning the supply of the one-dimensional or two-dimensional mode operation command to the encoder 16, causes the latch 22 to hold the count then reached by the counter 20. Thereafter, a picture signal associated with the (K+1)-th line is received. Then, as previously described, when the (K+1)-th line picture signal has been applied to the 1-line buffer 12 and transition point detector 18, the encoder 16 processes the K-th line and (K−1)-th line picture signals output respectively from the 1-line buffers 12 and 14 in the one-dimensional mode or in the two-dimensional mode as commanded by the decision circuit 26. The output of the encoder 16 is routed to a processing circuit at the following stage.

Figure 2:
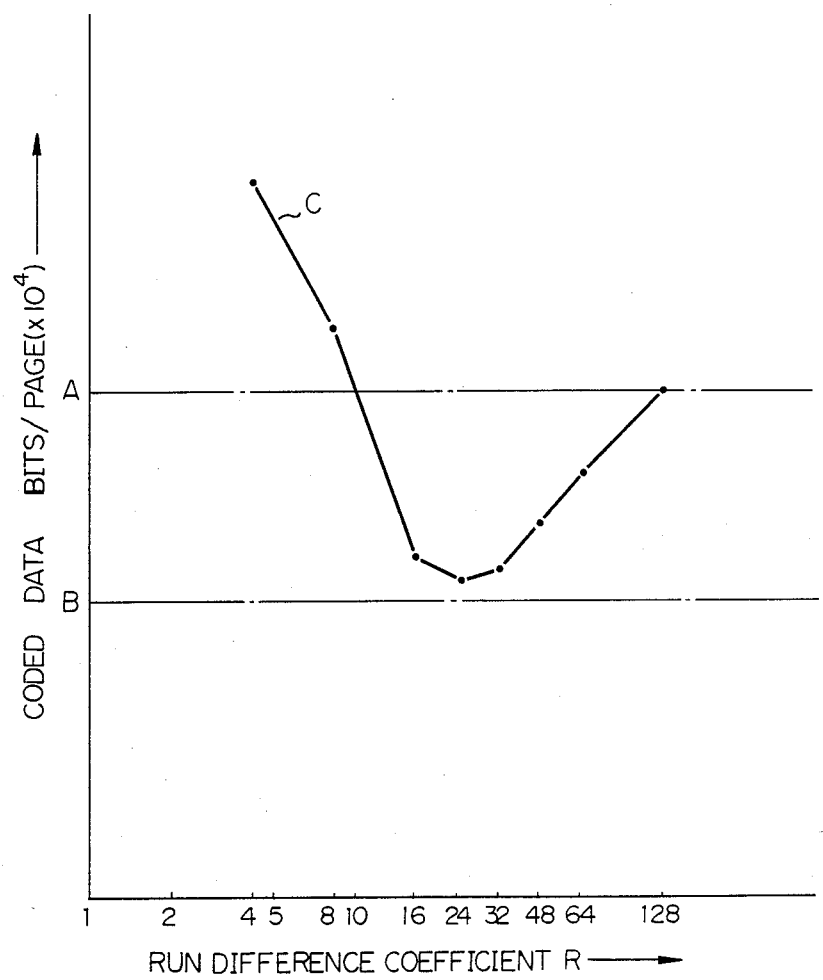
FIG. 2 is a plot showing a result of computer simulation performed to determine a number of encoded bits with respect to various run difference coefficients.

Referring to FIG. 2, there is shown a result of computer simulation in which picturesignals were coded by selectively employing the one-dimensional and two-dimensional coding modes in the manner described above.

In FIG. 2, the abscissa indicates run difference coefficients R and the ordinate, numbers of data bits after encoding. In the computer simulation, use was made of CCITT1 (A4 size) as a test chart and the resolution for scanning was eight lines per millimeter in the main scan direction and four lines per millimeter in the subscan direction. A in FIG. 2 indicates a number of encoded bits per page obtained by effecting one-dimensional mode coding on the first one line only and two-dimensional mode coding on all the other lines, while B indicates an ideal number of encoded bits per page attainable by processing all the lines in the encoding mode which provides a smaller number of encoded bits. Further, a curve C represents a characteristic in accordance with the embodiment shown and described.

It will be seen from the plot of FIG. 2 that while the compression efficiency greatly differs from one run difference coefficient R to another, the number of encoded bits approaches the ideal value B when the run difference coefficient R is twenty-four, meaning a significant improvement in compression efficiency. In this connection, the number of lines for which the one-dimensional mode operation was selected is eighty-eight which implies a speed-up by about 4.8% over the case with the two-dimensional mode operation only.

In summary, it will be seen that the present invention provides a data compression device for a picture processing apparatus which shortens a transmission time by efficiently selecting a coding mode based on a simple method of determining a correlation between adjacent scanning lines, which relies on subtraction only.

Various modifications will become possible for those skilled in the art after receiving the teachings of the present disclosure without departing from the scope thereof.

What is claimed is:

1. A data compression device for redundancy reduction coding picture signals, comprising:
   (a) transition point detector means for detecting transition points of picture signals associated with two adjacent scanning lines;
   (b) transition point counter means for counting the detected transition points of the picture signals;
   (c) calculator means for producing an absolute value of a difference between the counted numbers of transition points of the respective picture signals;
   (d) decision means for comparing said calculated absolute value with a predetermined value to select an adequate coding mode; and
   (e) encoder means for selectively performing a one-dimensional mode coding operation and a two-dimensional mode coding operation in response to a result of the selection by said decision means.

2. A data compression device as claimed in claim 1, in which the transition points are points where the picture signals change from black to white or from white to black.

3. A data compression device as claimed in claim 1, in which the decision means is constructed to control the encoder means such that the encoder means performs the one-dimensional mode coding operation when the absolute value is larger than the predetermined value and the two-dimensional mode coding operation when the absolute value is equal to or smaller than the predetermined value.

4. A data compression device as claimed in claim 1, in which the transition point detector means comprises a pulse generator for generating a pulse every time the transition point detector means detects a transition point.

5. A data compression device as claimed in claim 4, in which the counter means comprises a pulse counter for counting the pulses and a latch for latching a count of the pulses.

6. A data compression device as claimed in claim 5, in which the calculator means comprises a subtractor for producing a difference between an output of the pulse counter and an output of the latch by subtraction.

7. A data compression device as claimed in claim 1, further comprising a first one-line buffer for storing one line of picture signal, and a second one-line buffer supplied with said one line of picture signal stored in said first one-line buffer when the next one line of picture signal is applied to the first 1-line buffer.

8. A data compression device for redundancy reduction coding picture signals, comprising:
 (a) transition point detector means for detecting transition points of picture signals associated with two adjacent scanning lines;
 (b) transition point counter means for counting the detected transition points of the picture signals;
 (c) calculator means for producing an absolute value of a difference between the counted numbers of transition points of the respective picture signals;
 (d) decision means for comparing said calculated absolute value with a predetermined value to select an adequate coding mode; and
 (e) encoder means for selectively performing a one-dimensional mode coding operation and a two-dimensional mode coding operation in response to a result of the selection by said decision means;
the transition point detector means comprising a pulse generator for generating a pulse every time the transition point detector means detects a transition point;
the counter means comprising a pulse counter for counting the pulses of a current scanning line and a latch for latching a count of the pulses of a previous adjacent scanning line;
the calculator means comprising a subtractor for producing a difference between an output of the pulse counter and an output of the latch by subtraction.

9. A data compression device as claimed in claim 8, in which the decision means is constructed to control the encoder means such that the encoder means performs the one-dimensional mode coding operation when the absolute value is larger than the predetermined value and the two-dimensional mode coding operation when the absolute value is equal to or smaller than the predetermined value.

* * * * *